United States Patent [19]

Terry

[11] Patent Number: 4,880,030
[45] Date of Patent: Nov. 14, 1989

[54] SAFETY FLOW CONTROL FLUID SHUTOFF DEVICE

[76] Inventor: Paul E. Terry, 23844 Via Jacara, Valencia, Calif. 91355

[21] Appl. No.: 224,048

[22] Filed: Jul. 25, 1988

[51] Int. Cl.$^4$ ............................................. F16K 17/30
[52] U.S. Cl. .................................. 137/460; 137/462; 137/504; 137/517; 137/599
[58] Field of Search ............... 137/460, 462, 498, 504, 137/512.1, 517, 599, 599.1, 205.5

[56] References Cited

U.S. PATENT DOCUMENTS

| | | | |
|---|---|---|---|
| 805,498 | 11/1905 | Stewart | 137/517 X |
| 806,268 | 12/1905 | Koontz | 137/599.1 X |
| 1,186,147 | 6/1916 | Syakas | 137/462 |
| 3,106,937 | 10/1963 | Sands | 137/462 X |
| 3,377,109 | 4/1968 | Scott | 137/498 X |
| 4,049,016 | 9/1977 | Henry | 137/517 X |

FOREIGN PATENT DOCUMENTS

| | | | |
|---|---|---|---|
| 351148 | 7/1905 | France | 137/498 |
| 2450407 | 10/1980 | France | 137/498 |
| 177448 | 12/1961 | Sweden | 137/498 |

Primary Examiner—Stephen M. Hepperle
Attorney, Agent, or Firm—John J. Posta, Jr.

[57] ABSTRACT

A device for use as a safety device to cut off the water supply to a house or building in the event of overly high water consumption due to a leak or break in the plumbing in the house or building is disclosed which has only three moving parts and is of simple and inexpensive to manufacture construction. The safety flow control device of the present invention has a three position selector valve which selectively either allows water to flow freely through the safety flow control device as if it were not there, diverts water through a safety flow chamber, or acts as a shutoff valve by preventing the flow of water into the main water line entrance of the house or building. When the device is operating as a safety flow control device, a piston having apertures therethrough is spring biased away from a flange to allow water to pass through the device; when the water pressure is large, indicating a downstream plumbing break or leak, the water pressure will overcome the force exerted by the spring and force the piston against the flange, blocking the apertures and stopping flow through the device.

6 Claims, 5 Drawing Sheets

SAFETY FLOW CONTROL FLUID SHUTOFF DEVICE

BACKGROUND OF THE INVENTION

Field of the Invention - The present invention relates generally to a safety device which cuts off the water supply to a house or building in the event of overly high water consumption due to a leak or break in the plumbing in the house or building, and more particularly to an improved safety flow device having only three moving parts and of simple and inexpensive to manufacture construction.

Other than fire, perhaps the most catastrophic type of damage which can occur to a home or other building is damage due to water leakage from a broken or badly leaking water line. Since water supply lines may run throughout a house or other building, a leak may occur in the heart of the house or other building, and may result in extensive damage both to the structure and to the contents prior to the water supply being manually shut off.

As will be known by those skilled in the art, there exist a number of devices which are designed to control flow, and to act as a shutoff in the event of a leak. These devices generally fall into two major categories, namely the shock operated type and the flow or pressure operated type. The shock operated device is designed to operate to shut off flow in the event of a major shock, such as that of an earthquake or the like Examples of such devices are found in U.S. Pat. No. 3,747,616, to Lloyd, in U.S. Pat. No. 3,768,497, to Mueller, in U.S. Pat. No. 4,091,831, to Pazmany, in U.S. Pat. No. 4,336,818, to Dauvergne, and in U.S. Pat. No. 4,485,832, to Plemmons et al. These devices are all designed for use with gas lines, and do not address the problem of breaks or leaks in the line downstream of the devices.

The second approach, which causes a shutoff of flow in the event of an overly large flow rate or an excess pressure drop across the device, are illustrated by U.S. Pat. No. 2,659,383, to Frager, U.S. Pat. No. 4,522,229, to Van de Moortele, and U.S. Pat. No. 4,665,932, to Quenin. All three of these devices are designed primarily for industrial applications, and are large, complex, and expensive, and therefore are unsuitable for use in a home or other relatively small building. For example, the Frager device used two pistons to operate a complex camming mechanism which in turn operates a third piston to drive the shutoff mechanism. Even in the schematic depiction of the Frager patent, there are over fifteen moving parts, with the actual implementation being even more complex. The Frager device is intended for use as a primary shutoff mechanism in water mains, and simply does not have application for use with houses and like buildings.

The Van de Moortele device is a multi-purpose safety device, and cuts water off in the event of a downstream leak, the expiration of a predetermined time, or an excessive flow rate. In the schematic depiction in the Van de Moortele patent, no less than seventeen moving parts are shown, with substantially more no doubt being needed in an actual embodiment. Finally, the Quenin device is intended for use in hydro-electric installations, and functions as a shutdown valve in the event of an accident which is evidenced by a highly excessive flow rate. It is a differential amplifier device, operating using static and total pressures measured by Pitot tubes in the flow stream, and is quite complex. In addition, the Quenin device is not designed to be responsive to the situation contemplated by the present invention, namely a leak in downstream plumbing.

It will accordingly be appreciated that the devices described above are not intended for the particular application contemplated by the present invention, and as such do not represent desirable solutions to the problem addressed by the present invention. It is accordingly the primary objective of the present invention to present a solution to the problem of plumbing breaks and leaks in a house or like building. Upon the occurrence of such a break or leak in the plumbing of a house or like building, it is the objective of the present invention to immediately sense the break or leak and promptly shut down the flow of water to the plumbing.

It is also an objective of the present invention to have as few moving parts as possible, both to minimize the cost af manufacture and to make the device of the present invention as reliable as possible, with a long life expectancy without the necessity of maintenance. It must be totally reliable, with a fail-safe mode of operation to ensure reliable shutoff in the event of a plumbing break or leak even after years of use. It is also desirable that the device include means for bypassing the safety flow operation if desired, and that it function as a shutoff valve as well to allow repairs to be done on the plumbing. Further, the present invention must be both simple of construction and easy to install to enable it to be easily and quickly installable into the plumbing system of any house or like building.

The device of the present invention must therefore be simple and inexpensive of construction with a minimal number of moving parts, have an extended, highly reliable operating life, and must operate flawlessly and immediately upon the occurrence of a plumbing break or leak to shut off the flow of water, thereby preventing extensive water damage to the house or like building. It must overcome the disadvantages of the art and accomplish all of the above advantages and objectives while incurring substantially no disadvantage. Such an apparatus will represent both a highly desirable improvement in the art and a marketable and useful device.

SUMMARY OF THE INVENTION

The disadvantages and limitations of the background art discussed above are overcome by the present invention. With this invention, a safety flow control device is installed in the line between the water supply line and the main water line entrance to a house or like building. The safety flow control device has a three position selector valve which selectively either allows water to flow freely through the safety flow control device as if it were not there, diverts water through a safety flow chamber, or acts as a shutoff valve by preventing the flow of water into the main water line entrance. The three position selector valve is of simple construction, and comprises only a single moving part.

When water is diverted to flow through the safety flow chamber, the safety mechanism of the present invention is brought into play. The safety flow chamber consists of a safety flow inlet into which water is diverted from the water supply line by the three position selector valve, a cylindrical valve chamber, a safety flow channel having a smaller diameter than the cylindrical valve chamber, and an safety flow outlet through which water exits the safety flow chamber into the main water line entrance to the house or like building. The safety flow channel is located immediately downstream from the cylindrical valve chamber, and is concentric with and open to the larger diameter cylindrical valve chamber. The end of the cylindrical valve chamber adjacent the safety flow channel extends radially inwardly, creating a washer-shaped sealing flange.

Located in the cylindrical valve chamber is an essentially cylindrical piston valve body, which has in the preferred embodiment three apertures extending longitudinally therethrough closely adjacent the edges of the piston valve body. The piston valve body closely fits in the cylindrical valve chamber, and is free to move in the cylindrical valve chamber in reciprocating fashion. When the piston valve body abuts the washer-shaped sealing flange, the three apertures in the piston valve body are blocked by the washer-shaped sealing flange. The end of the piston valve body facing the safety flow channel includes a segment extending into the safety flow channel when the piston valve body abuts the washer-shaped sealing flange.

A spring is used to bias the piston valve body away from the washer-shaped sealing flange, creating a flow path through the three apertures in the piston valve body, around the end of the piston valve body facing the safety flow channel, and through the safety flow channel. In normal operation, water will flow through this flow path, and through the device into the main water line entrance to the house or like building. The water pressure and flow are balanced by the spring pressure to keep the flow path open. If water flow through the device becomes excessive, the pressure across the piston valve body will overcome the spring pressure, and force the piston valve body into contact with the washer-shaped sealing flange, blocking the three apertures through the piston valve body and stopping flow through the device.

It will thus be appreciated by those skilled in the art that in the event of a break or serious leak in the plumbing line downstream from the safety flow control device of the present invention, the piston valve body will move into contact with the washer-shaped sealing flange to stop flow through the device. The only moving parts in the safety flow chamber are the piston valve body and the spring. By varying the relative size of the piston valve body, the size and number of the apertures in the piston valve body, and the force of the spring, the operating characteristics of the device may be varied. If desired, the position of the spring may also be varied to adjust the force exerted by the spring on the piston valve body.

It may therefore be seen that the present invention presents an excellent resolution to the problem of plumbing breaks and leaks in a house or like building. Upon the occurrence of such a break or leak in the plumbing of a house or like building, the present invention immediately senses the break or leak, and promptly shuts down the flow of water to the plumbing. It also has only three moving parts, only two of which are used for the operation of the shutoff system, thereby minimizing the cost of manufacture and simultaneously making the device of the present invention as reliable as possible, with a long life expectancy without the necessity of maintenance.

In fact, the system of the present invention is totally reliable, with a fail-safe mode of operation to ensure reliable shutoff in the event of a plumbing break or leak even after years of use. The device also includes means for bypassing the safety flow operation if desired, thereby allowing it to function as a shutoff valve as well to allow repairs to be done on the plumbing. Further, the present invention is simple of construction and installation to enable it to be easily and quickly installable into the plumbing system of any house or like building.

The device of the present invention is therefore simple and inexpensive of construction with a minimal number of moving parts, has an extended, highly reliable operating life, and operates flawlessly immediately upon the occurrence of a plumbing break or leak to shut off the flow of water, thereby preventing extensive water damage to the house or like building. It overcomes the disadvantages of the art and accomplishes all of the afore-stated advantages and objectives while incurring substantially no disadvantage, and thereby represents a highly desirable improvement in the art.

DESCRIPTION OF THE DRAWINGS

These and other advantages of the present invention are best understood with reference to the drawings, in which.

DETAILED DESCRIPTION OF THE PREFERRED EMBODIMENT

Figure 1:
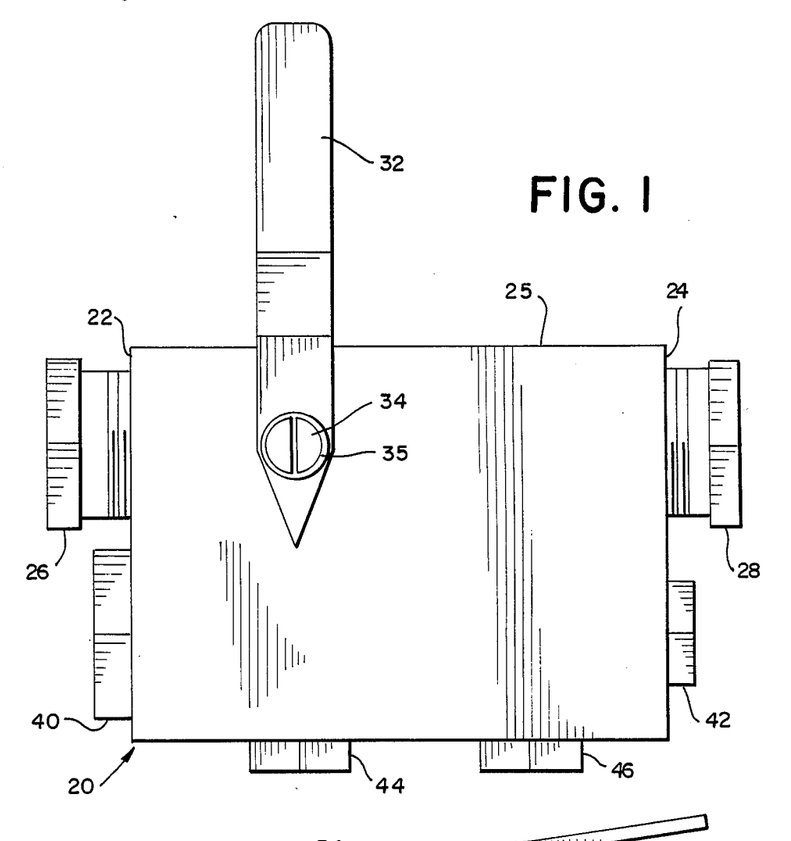
FIG. 1 is a front plan view of the safety flow control device of the present invention.
Figure 2:
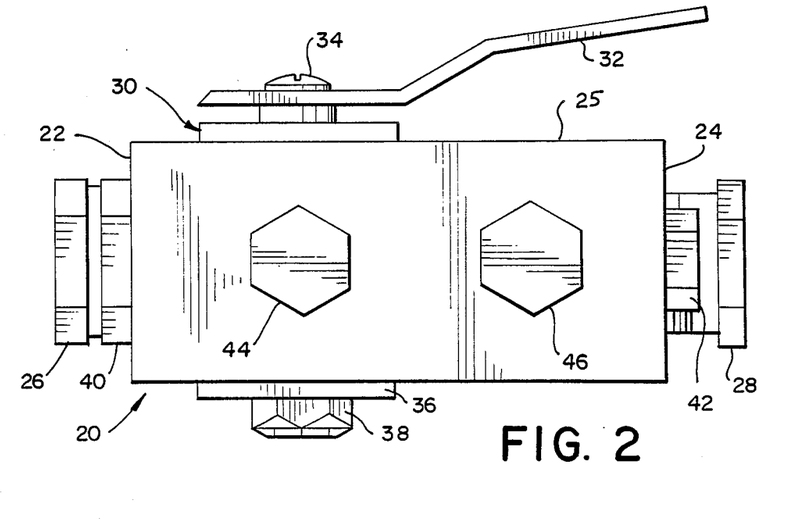
FIG. 2 is a side plan view of the safety flow control device shown in FIG. 1.

The preferred embodiment of the present invention is illustrated in FIGS. 1 and 2, which show a safety flow control device 20 having a main inlet 22 and a main outlet 24 located in opposite ends of a housing 25. The main inlet 22 and the main outlet 24 are both internally threaded into the housing 25, as may be seen in FIG. 3, for example. Shown installed in the main inlet 22 is a one inch by three-quarter inch pipe reducer 26, and similarly installed in the main outlet 24 is a one inch by three-quarter inch pipe reducer 28. The one inch by three-quarter inch pipe reducers 26 and 28 may be used in some installations, or other fittings well known in the art could also be used, as desired.

In either event, the main inlet 22 will be connected to the water supply line (not shown), and the main outlet 24 will be connected to the main water line entrance to a house or like building (not shown). Mounted in the housing 25 of the safety flow control device 20 in rotatable fashion is a three position selector valve 30, the construction of which will be discussed in detail in conjunction with FIGS. 8 through 11 below. Mounted onto one end of the three position selector valve 30 is a handle 32, which is secured onto the three position selector valve 30 with a bolt 34 and a washer 35. It should be noted that the position the handle 32 is shown in FIG. 1 is not one of the three positions it is used in; rather, it is shown in the position of FIG. 1 for clarity.

Mounted onto the other end of the three position selector valve 30 is a retaining washer 36, which is secured onto the three position selector valve 30 with a nut 38. The nut 38 is preferably a nylon lock nut, which will stay in place on the end of the three position selector valve 30 once installed. Also installed in the housing 25 are four screw-in plugs 40, 42, 44, and 46. The plug 40 is located in the end of the housing 25 in which the main inlet 22 is located, the plug 42 is located in the end of the housing 25 in which the main outlet 24 is located, and the plugs 44 and 46 are located in the side of the housing 25.

Referring next to FIGS. 3 through 7, the interior of the housing 25 is illustrated. A cylindrical bore 50 extends through the housing 25 from one end to the other, with one end of the cylindrical bore 50 comprising the main inlet 22, and the other end of the cylindrical bore 50 comprising the main outlet 24. Note that both the main inlet 22 and the main outlet 24 are threaded to accept standard plumbing fittings (such as the one inch by three-quarter inch pipe reducers 26 and 28 shown in FIGS. 1 and 2).

A cylindrical valve chamber 52 is bored into the housing 25 from the end of the housing 25 in which the main inlet 22 is located. The cylindrical valve chamber 52 extends slightly more than halfway through the housing 25 toward the end of the housing 25 in which the main outlet 24 is located. Note that the end of the cylindrical valve chamber 52 toward the end of the housing 25 in which the main outlet 24 is located is milled flat.

A safety flow channel 54 is bored into the housing 25 from the end of the housing 25 in which the main outlet 24 is located. The bore of the safety flow channel 54 is substantially smaller in diameter than the cylindrical valve chamber 52. The safety flow channel 54 is concentric with and in fluid communication with the larger diameter cylindrical valve chamber 52. The end of the cylindrical valve chamber 52 adjacent the safety flow channel 54 thus extends radially inwardly, creating a washer-shaped sealing flange 56. The cylindrical valve chamber 52 has a threaded portion 60 adjacent the end of the housing 25 in which the main inlet the main inlet 22 is located, and the safety flow channel 54 has a threaded portion 62 adjacent the end of the housing 25 in which the main outlet 24 is located.

A safety flow inlet channel 64 is bored into the housing 25 through the side of the housing 25, then through the cylindrical valve chamber 52, and then into the cylindrical bore 50. The safety flow inlet channel 64 is closer to the end of the housing 25 in which the main inlet 22 is located than it is to the end of the housing 25 in which the main outlet 24 is located. Note that the safety flow inlet channel 64 is essentially orthogonal to both the cylindrical valve chamber 52 and the cylindrical bore 50.

A safety flow outlet channel 66 is bored into the housing 25 through the same side of the housing 25 as is the safety flow inlet channel 64, then through the safety flow channel 54, and then into the cylindrical bore 50. The safety flow outlet channel 66 is closer to the end of the housing 25 in which the main outlet 24 is located than it is to the end of the housing 25 in which the main inlet 22 is located. Note that the safety flow outlet channel 66 is essentially orthogonal to both the safety flow channel 54 and the cylindrical bore 50.

Figure 14:
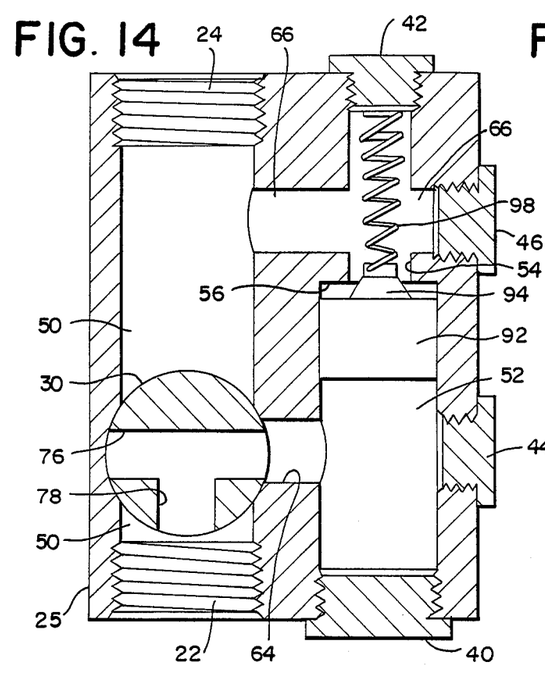
FIG. 14 is a cutaway view of the assembled safety flow control device of the present invention with the three position selector valve in a position to divert water through the safety flow chamber, and the piston valve body biased away from the washer-shaped sealing flange by the spring to allow water to flow through the device.

The safety flow inlet channel 64 has a threaded portion 68 adjacent the side of the housing 25 and between that side of the housing 25 and the cylindrical valve chamber 52. Likewise, the safety flow outlet channel 66 has a threaded portion 70 adjacent the same side of the housing 25. Referring for the moment to FIG. 14, it may be noted that the plug 40 is installed in the threaded portion 60 of the cylindrical valve chamber 52, the plug 42 is installed in the threaded portion 62 of the safety flow channel 54, the plug 44 is installed in the threaded portion 68 of the safety flow inlet channel 64, and the plug 46 is installed in the threaded portion 70 of the safety flow outlet channel 66. The plugs 40, 42, 44, and 46 are each sealingly installed using an O-ring, as is well known in the art.

Figure 3:
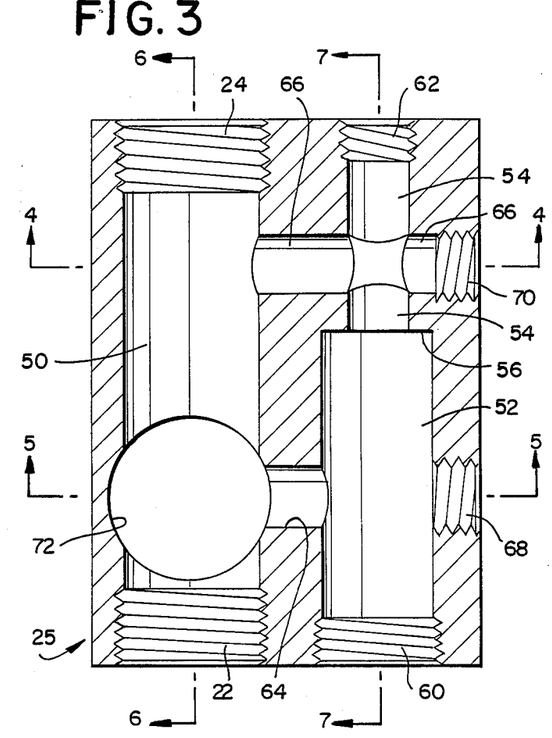
FIG. 3 is a cutaway view of the housing of the safety flow control device shown in FIGS. 1 and 2.
Figure 4:
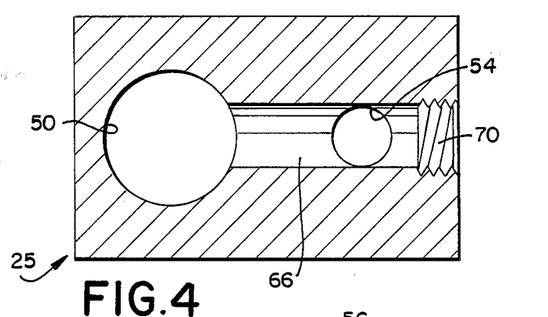
FIG. 4 is a cutaway view of the housing of the safety flow control device shown in FIGS. 1 and 2 along the centerline of the safety flow outlet.
Figure 5:
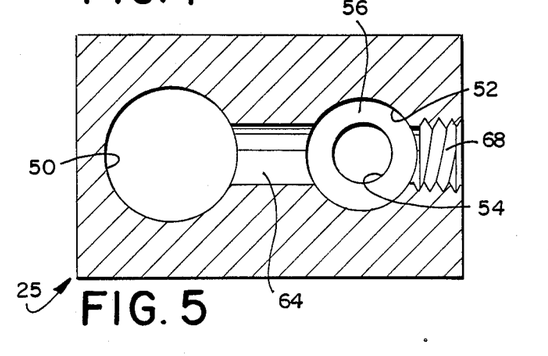
FIG. 5 is a cutaway view of the housing of the safety flow control device shown in FIGS. 1 and 2 along the centerline of the safety flow inlet.
Figure 6:
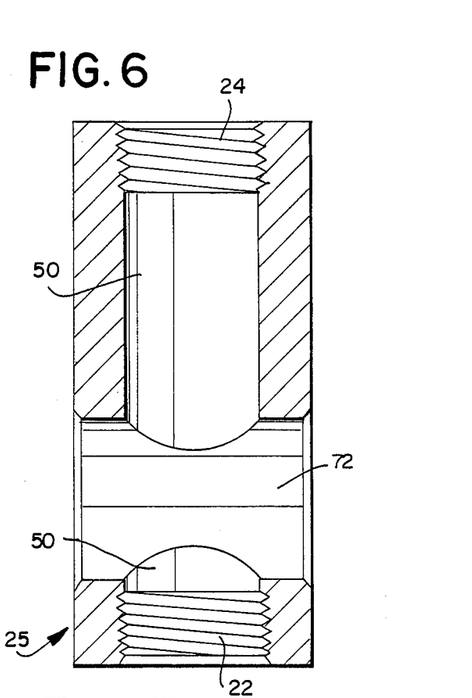
FIG. 6 is a cutaway view of the housing of the safety flow control device shown in FIGS. 1 and 2 along the centerlines of the main inlet and outlet.

Referring now to FIGS. 3 and 6, a cylindrical aperture 72 is bored in the housing 25 from the front to the back of the housing 25, and through the cylindrical bore 50. Note that the cylindrical aperture 72 is orthogonal to both the cylindrical bore 50 and the safety flow inlet channel 64, and that the diameter of the cylindrical aperture 72 is larger than the diameter of the cylindrical bore 50 (and also larger than the bore of the safety flow inlet channel 64). If a solid cylinder were placed in the cylindrical aperture 72 it would block fluid communication between the cylindrical bore 50 and the safety flow inlet channel 64.

It will be appreciated that the cylindrical bore 50 extends directly between the main inlet 22 and the main outlet 24. An alternate fluid flow path is through a safety flow chamber which consists of the safety flow inlet channel 64 into which water may be diverted from the main inlet 22, the cylindrical valve chamber 52, the safety flow channel 54, and the safety flow outlet channel 66 through which water may exit the safety flow chamber through the main outlet 24. The preferred material for fabrication of the housing 25 is brass.

Referring now to FIGS. 8 through 11, the three position selector valve 30 and the handle 32 are shown in detail. The three position selector valve 30 has a cylindrical main segment 74, with an elongated aperture 76 extending diametrically through the cylindrical main segment 74. A circular aperture 78 extends radially from one side of the cylindrical main segment 74, and is in fluid communication with the elongated aperture 76. The circular aperture 78 is orthogonal to the elongated aperture 76, both in the plane of FIG. 8 and in the plane of FIG. 9.

The three position selector valve 30 has a large diameter washer-shaped portion 80 located on the end to which the handle 32 is attached, with the large diameter washer-shaped portion 80 being larger in diameter than the diameter of the cylindrical aperture 72 in the housing 25 (FIGS. 3 and 6). Between the large diameter washer-shaped portion 80 and the cylindrical main segment 74 is a recessed portion 82 in which an O-ring (not shown) may be installed to obtain a seal on one side of the cylindrical main segment 74. Similarly, on the other side of the cylindrical main segment 74 is a recessed portion 84 in which an O-ring (not shown) may be installed.

On the end of the three position selector valve 30 on which the handle 32 is installed is located a rectangular projection 86 having a threaded aperture 87 therein. The handle 32 has a rectangular aperture 88 therein, which rectangular aperture 88 receives the rectangular projection 86 of the three position selector valve 30 therein. The bolt 34 and the washer 35 are then used to retain the handle 32 in position on the three position selector valve 30.

Located at and extending from the other end of the three position selector valve 30 is a threaded stud 90. The three position selector valve 30 may be installed in the cylindrical aperture 72 (FIGS. 3 and 6) by inserting the end of the three position selector valve 30 on which the threaded stud 90 is located through the cylindrical aperture 72. The retaining washer 36 (FIG. 1) is then placed over the threaded stud 90, and the nut 38 (FIG. 1) is screwed onto the threaded stud 90 to retain the three position selector valve 30 in place in the housing 25. The three position selector valve 30 may be rotated by using the handle 32 to select the fluid path.

Figure 16:
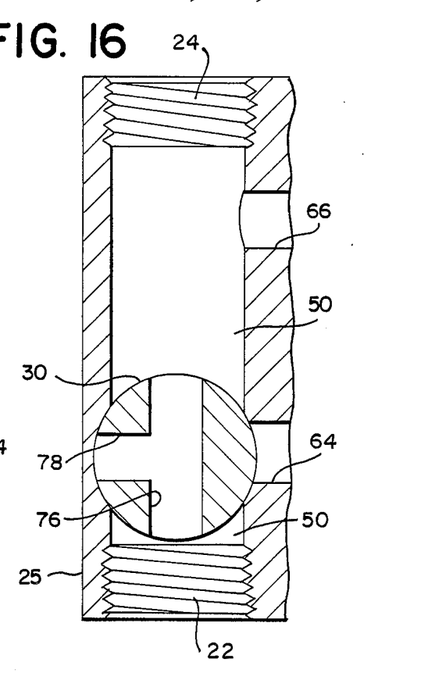
FIG. 16 is a cutaway view of a portion of the assembled safety flow control device of the present invention with the three position selector valve in a position to allow water to flow freely through the safety flow control device.
Figure 17:
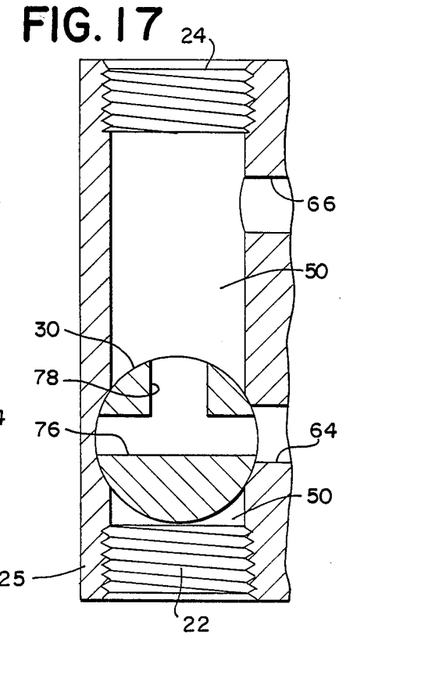
FIG. 17 is a cutaway view of a portion of the assembled safety flow control device of the present invention with the three position selector valve in a position to prevent the flow of water through the safety flow control device.

The three position selector valve 30 of the safety flow control device 20 may be selectively moved between three positions. The first position, which allows water to flow freely through the safety flow control device 20 as if it were not there, is shown in FIG. 16. In this position, water may flow from the main inlet 22 through the elongated aperture 76 in the three position selector valve 30 to the main outlet 24. The second position, which diverts water through the safety flow chamber, is shown in both FIGS. 14 and 15. The third position, which acts as a shutoff valve by entirely preventing the flow of water through the safety flow control device 20, is shown in FIG. 17. In this position, the three position selector valve 30 is turned so that the side of the three position selector valve 30 opposite the circular aperture 78 faces the main inlet 22, thereby blocking the flow of water.

Figure 12:
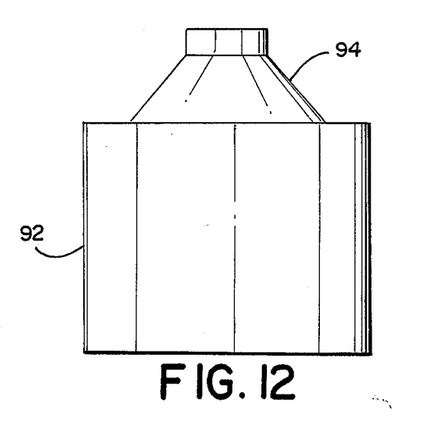
FIG. 12 is a side plan view of the piston valve body.
Figure 13:
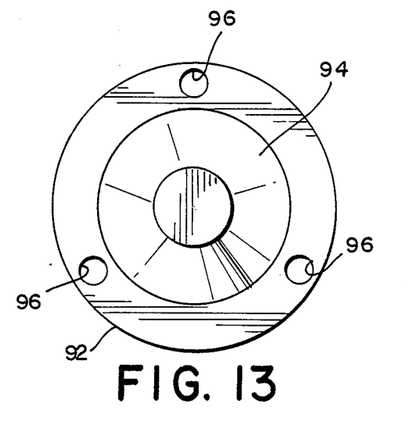
FIG. 13 is an end view of the piston valve body shown in FIG. 12.

Referring next to FIGS. 12 and 13, an essentially cylindrical piston valve body 92 is illustrated. One end of the piston valve body 92 has a segment 94 extending therefrom, with the shape of the segment 94 in the preferred embodiment being frustroconical adjacent the piston valve body 92 and cylindrical at the end of the frustroconical segment away from the piston valve body 92. The piston valve body 92 is of a diameter which will closely fit in the cylindrical valve chamber 52 (FIGS. 3 and 7), while remaining free to move in the cylindrical valve chamber 52 in reciprocating fashion. In the preferred embodiment, the piston valve body 92 is made of TEFLON, a polytetrafluoroethylene compound.

Figure 7:
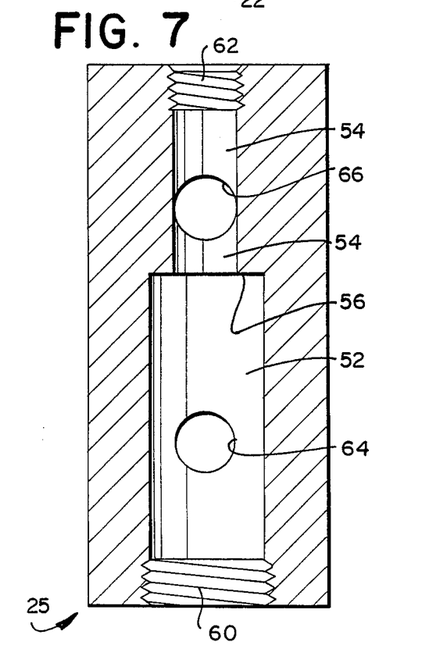
FIG. 7 is a cutaway view of the housing of the safety flow control device shown in FIGS. 1 and 2 along the centerlines of the cylindrical valve chamber and the safety flow channel.
Figure 8:
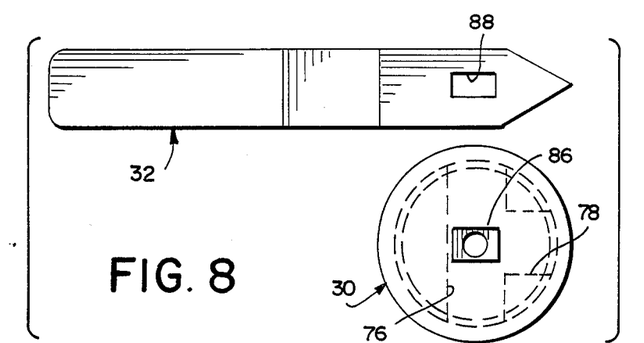
FIG. 8 is an end view of the three position selector valve and the handle used to turn the three position selector valve.
Figure 9:
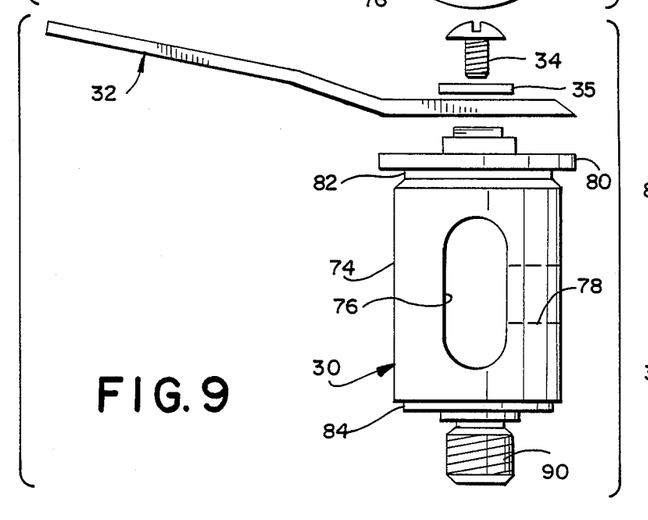
FIG. 9 is a side plan view of the three position selector valve shown in FIG. 8.
Figure 10:
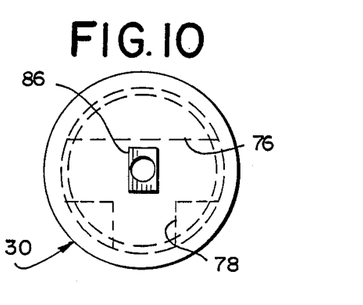
FIG. 10 is an end view of the three position selector valve shown in FIGS. 8 and 9, but rotated ninety degrees from the view in FIG. 8.
Figure 11:
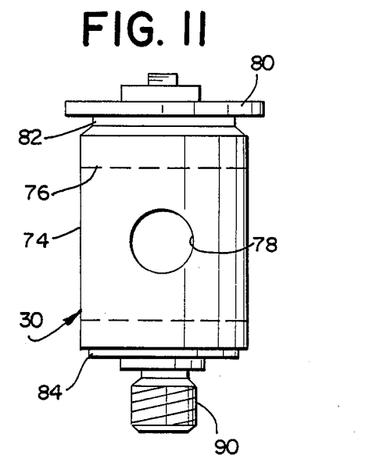
FIG. 11 is a side plan view of the three position selector valve shown in FIGS. 8 through 10, but rotated ninety degrees from the view in FIG. 9.

The segment 94 at its widest diameter is sized to fit freely in the safety flow channel 54, even when the piston valve body 92 abuts the washer-shaped sealing flange 56 (FIGS. 3 and 7). A plurality of apertures 96 extend longitudinally through the piston valve body 92 closely adjacent the edges of the piston valve body 92. In the preferred embodiment, there are three apertures 96. Note that the apertures 96 are spaced away from the segment 94. When the piston valve body 92 abuts the washer-shaped sealing flange 56 (FIGS. 3 and 7), the three apertures 96 in the piston valve body 92 are blocked by the washer-shaped sealing flange 56 (FIGS. 3 and 7).

Figure 15:
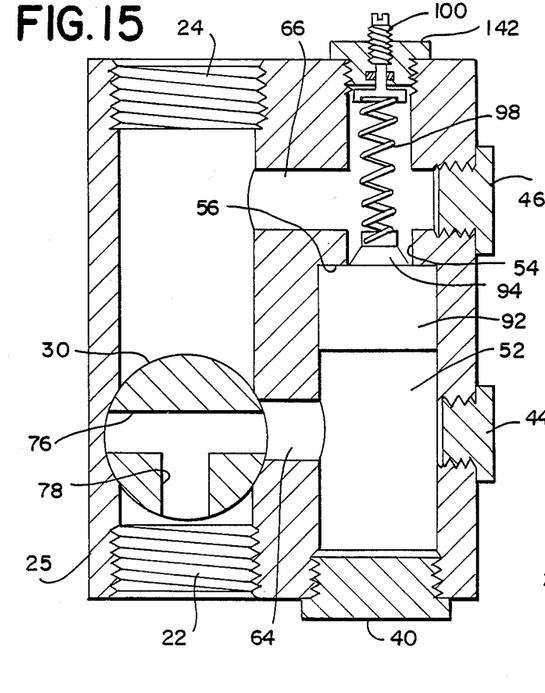
FIG. 15 is a cutaway view of the assembled safety flow control device of the present invention with the three position selector valve in a position to divert water through the safety flow chamber, and the piston valve body forced against the washer-shaped sealing flange by water pressure indicative of a break or serious leak in the downstream plumbing, with water not being allowed to flow through the device.

Referring next to FIGS. 14 and 15, the piston valve body 92 is shown installed in the housing 25. A spring 98 is used to bias the piston valve body 92 away from the washer-shaped sealing flange 56, creating a flow path through the three apertures 96 (FIG. 13) in the piston valve body 92, around the end of the piston valve body 92 facing &:he safety flow channel 54, and through the safety flow channel 54 as shown in FIG. 14. One end of the spring 98 is retained by the plug 42, and the other end of the spring 98 fits over the cylindrical portion of the segment 94 on the piston valve body 92.

In normal operation as shown in FIG. 14, water will flow in the safety flow control device 20 through the main inlet 22, through the circular aperture 78 and the elongated aperture 76 in the three position selector valve 30, through the safety flow inlet channel 64 into the cylindrical valve chamber 52, through the apertures 96 in the piston valve body 92, around the end of the piston valve body 92 facing the safety flow channel 54 and through the safety flow channel 54 and the washer-shaped sealing flange 56, through the safety flow outlet channel 66, and out of the safety flow control device 20 through the main outlet 24 into the main water line entrance to the house or like building.

The water pressure and flow are balanced by the pressure of the spring 98 to keep the flow path open. If water flow through the safety flow control device 20 becomes excessive (the situation shown in FIG. 15), the pressure across the piston valve body 92 will overcome the pressure of the spring 98, and force the piston valve body 92 into contact with the washer-shaped sealing flange 56, blocking the three apertures 96 through the piston valve body 92 and stopping flow through the safety flow control device 20 as shown in FIG. 15.

It will be appreciated by those skilled in the art that in the event of a break or serious leak in the plumbing line downstream from the safety flow control device 20 of the present invention, the piston valve body 92 will move into contact with the washer-shaped sealing flange 56 to stop flow through the safety flow control device 20. The only moving parts in the safety flow chamber are the piston valve body 92 and the spring 98. By varying the relative size of the piston valve body 92, the size and number of the apertures 96 in the piston valve body 92, and the force of the spring 98, the operating characteristics of the safety flow control device 20 may be varied.

If desired, the position of the spring 98 may also be varied to adjust the force exerted by the spring 98 on the piston valve body 92. In FIG. 15, a plug 142 is used instead of the plug 42 to seal the threaded portion 62 (FIGS. 3 and 7) of the safety flow channel 54. An adjustment screw 100 is installed in a threaded aperture in the plug 142 to adjust the position of the spring 98 at one end thereof. This of course will adjust the force exerted by the spring 98 on the piston valve body 92, and also the amount of water pressure required to move the piston valve body 92 into contact with the washer-shaped sealing flange 56, stopping flow through the safety flow control device 20. One or more O-rings may be used to seal between adjustment screw 100 and the plug 142.

Figure 18:
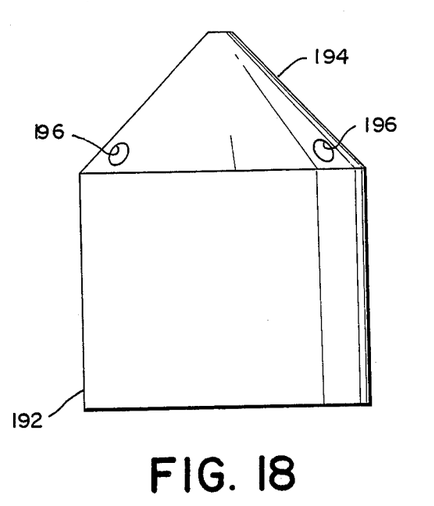
FIG. 18 is a side plan view of an alternate embodiment of the piston valve body.
Figure 19:
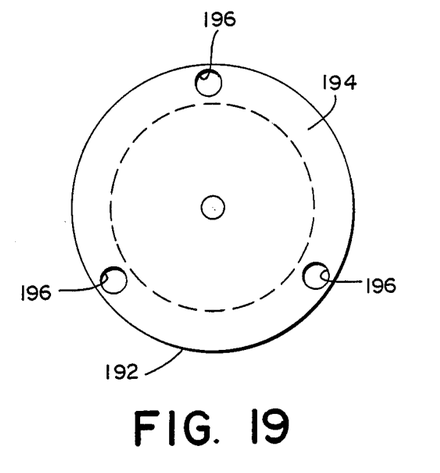
FIG. 19 is an end view of the alternate embodiment piston valve body shown in FIG. 18.

In another alternate embodiment, a modified piston valve body 192 as shown in FIGS. 18 and 19 is used instead of the piston valve body 92 shown in FIGS. 12 and 13. The modified piston body 192 is identical in the cylindrical portion thereof; however, the segment 94 is replaced by a frustroconical segment 194, which extends from the outer diameter of the cylindrical portion of the modified piston valve body 192. The apertures 196 therefore extend through a portion of the frustroconical segment 194 as well as longitudinally through the cylindrical portion of the modified piston valve body 192.

It will be appreciated by those skilled in the art that the frustroconical segment 194 will not entirely fit within the safety flow channel 54. Contact with the washer-shaped sealing flange 56 will be made by the frustroconical segment 194 at the location indicated by dotted lines in FIG. 19. It is apparent that the apertures 196 will not be within the safety flow channel 54 when the modified piston valve body 192 abuts the washer-shaped sealing flange 56. Accordingly, flow will be stopped in essentially the same manner as in the preferred embodiment.

It is apparent from the above description of the present invention that it presents an excellent resolution to the problem of plumbing breaks and leaks in a house or like building. It immediately senses the occurrence of a break or leak in the plumbing of a house or like building, and promptly shuts down the flow of water to the plumbing. The present invention has only three moving parts, of which only two are used for the actual operation of the shutoff system, thereby both minimizing the cost of manufacture and making the device of the present invention as reliable as possible.

The device of the present invention is completely reliable, and has a fail-safe mode of operation to ensure reliable shutoff in the event of a plumbing break or leak. It includes means for bypassing the safety flow operation if desired, allowing the device to function as a shutoff valve to allow repairs to be done on the plumbing. Further, the device of the present invention may be easily and quickly installed into the plumbing system of any house or like building.

The device of the present invention is thus simple and inexpensive of construction, has an extended, highly reliable operating life, and operates immediately upon the occurrence of a plumbing break or leak to shut off the flow of water, thereby preventing the possibility of extensive water damage to the house or like building. The disadvantages of the art are overcome by the present invention, and it accomplishes all of the aforestated advantages and objectives while incurring substantially no disadvantage, thereby representing a significant improvement in the art.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A safety flow control device for stopping the flow of fluid therethrough when there is a break or leak in the flow path downstream of said device, comprising:
   (a) a housing;
   (b) an inlet port located in said housing for admitting fluid to said housing;
   (c) an outlet port located in said housing for discharging fluid from said housing;
   (d) a cylindrical valve chamber located in said housing, said cylindrical valve chamber having a first end and a second end, said first end of said cylindrical valve chamber being in fluid communication with said fluid inlet, said cylindrical valve chamber having a first cross-sectional area;
   (e) washer-shaped sealing flange located at said second end of said cylindrical valve chamber;
   (f) a safety flow channel located in said housing, said safety flow chamber having a first end and a second end, said safety flow channel having a second cross-sectional area smaller than said first cross-sectional area, said first end of said safety flow channel being in fluid communication with said second end of said cylindrical valve chamber, said second end of said safety flow channel being in fluid communication with said fluid outlet;
   (g) a piston valve body located for reciprocating movement in said cylindrical valve chamber, said piston valve body having a plurality of longitudinally extending apertures therethrough, said apertures being blocked by said washer-shaped sealing flange when said piston valve body abuts said washer-shaped flange; and
   (h) means for biasing said piston valve body away from said washer-shaped flange, said biasing means thereby allowing fluid entering said one end of said cylinrical valve chamber to flow through said apertures and into said safety flow channel, said piston being forced against said biasing means into contact with said washer-shaped flange when a break or leak in the flow path downstream of said device;
   (i) wherein said piston valve body comprises a cylindrical element of a diameter which will closely fit in said cylindrical valve chamber, while remaining free to move in said cylindrical valve chamber in a reciprocating fashion;

(j) a segment extending from the end of said cylindrical element facing said washer-shaped sealing flange, with said segment having a frustroconical portion adjacent said cylindrical segment and a cylindrical portion at the end of said frustroconical portion away from said cylindrical element;

(k) wherein said apertures are located in said cylindrical element and are spaced away from said frustroconical portion.

2. A safety flow control device as defined in claim 1, wherein there are three apertures evenly spaced around the circumference of said cylindrical element.

3. A safety flow control device for stopping the flow of fluid therethrough when there is a break or leak in the flow path downstream of said device, comprising:

(a) a housing;

(b) an inlet port located in said housing for admitting fluid to said housing;

(c) an outlet port located in said housing for discharging fluid from said housing;

(d) a cylindrical valve chamber located in said housing, said cylindrical valve chamber having a first end and a second end, said first end of said cylindrical valve chamber being in fluid communication with said fluid inlet, said cylindrical valve chamber having a first cross-sectional area;

(e) washer-shaped sealing flange located at said second end of said cylindrical valve chamber;

(f) a safety flow channel located in said housing, said safety flow chamber having a first end and a second end, said safety flow channel having a second cross-sectional area smaller than said first cross-sectional area, said first end of said safety flow channel being in fluid communication with said second end of said cylindrical valve chamber, said second end of said safety flow channel being in fluid communication with said fluid outlet;

(g) a piston valve body located for reciprocating movement in said cylindrical valve chamber, said piston valve body having a plurality of longitudinally extending apertures therethrough, said apertures being blocked by said washer-shaped sealing flange when said piston valve body abuts said washer-shaped flange; and (h) means for biasing said piston valve body away from said washer-shaped flange, said biasing means thereby allowing fluid entering said one end of said cylindrical valve chamber to flow through said apertures and into said safety flow channel, said piston being forced against said biasing means into contact with said washer-shaped flange when a break or leak in the flow path downstream of said device;

(i) wherein said cylindrical valve chamber comprises a first aperture bored into said housing from one end thereof, said first aperture extending from said one end of said housing toward the other end of said housing;

(j) wherein said safety flow channel comprises a second aperture bored into said housing from said other end thereof, said second aperture extending from said other end of said housing toward said one end of said housing, said second aperture having a smaller diameter than said first aperture, said first and second apertures being coaxial and in fluid communication;

(k) a third aperture bored into said housing from one side thereof, said third aperture extending orthogonally through said first aperture; and (l) a fourth aperture bored into said housing from said one side thereof, said fourth aperture extending orthogonally through said second aperture; and (m) a fifth aperture extending from said one end of said housing to said other end of said housing, said fifth aperture being spaced away from said first and second apertures, one end of said fifth aperture comprising said inlet port, the other end of said fifth aperture comprising said outlet port, said third and fourth apertures being in fluid communication with said fifth aperture; and (n) means for controlling the path taken by fluid entering said inlet port.

4. A safety flow control device as defined in claim 3, wherein said controlling means comprises:

a three position valve having a first position in which fluid entering said inlet port flows through said fifth aperture directly to said outlet port, a second position in which fluid entering said inlet port is supplied directly to said third aperture, and a third position in which fluid entering said inlet port is prevented from communicating with any of the apertures in said housing.

5. A safety flow control device as defined in claim 4, wherein said three position valve is located at the intersection of said third and fifth apertures.

6. A safety flow control device for stopping the flow of fluid therethrough when there is a break or leak in the flow path downstream of said device, comprising:

(a) a housing;

(b) an inlet port located in said housing for admitting fluid to said housing;

(c) an outlet port located in said housing for discharging fluid from said housing;

(d) a cylindrical valve chamber located in said housing, said cylindrical valve chamber having a first end and a second end, said first end of said cylindrical valve chamber being in fluid communication with said fluid inlet, said cylindrical valve chamber having a first cross-sectional area;

(e) washer-shaped sealing flange located at said second end of said cylindrical valve chamber;

(f) a safety flow channel located in said housing, said safety flow chamber having a first end and a second end, said safety flow channel having a second cross-sectional area smaller than said first cross-sectional area, said first end of said safety flow channel being in fluid communication with said second end of said cylindrical valve chamber, said second end of said safety flow channel being in fluid communication with said fluid outlet;

(g) a piston valve body located for reciprocating movement in said cylindrical valve chamber, said piston valve body having a plurality of longitudinally extending apertures therethrough, said apertures being blocked by said washer-shaped sealing flange when said piston valve body abuts said washer-shaped flange; and (h) means for biasing said piston valve body away from said washer-shaped flange, said biasing means thereby allowing fluid entering said one end of said cylindrical valve chamber to flow through said apertures and into said safety flow channel, said piston being forced against said biasing means into contact with said washer-shaped flange when a break or leak in the flow path downstream of said device;
(i) wherein said cylindrical valve chamber comprises a first aperture bored into said housing from one end thereof, said first aperture extending from said one end of said housing toward the other end of said housing;
(j) wherein said safety flow channel comprises a second aperture bored into said housing from said other end thereof, said second aperture extending from said other end of said housing toward said one end of said housing, said second aperture having a smaller diameter than said first aperture, said first and second apertures being coaxial and in fluid communication;
(k) a third aperture bored into said housing from one side thereof, said third aperture extending orthogonally through said first aperture; and
(l) a fourth aperture bored into said housing from said one side thereof, said fourth aperture extending orthogonally through said second aperture; and
(m) a plurality of plugs for sealing the ends of said first, second, third, and fourth apertures at the ends and side of said housing.

* * * * *